United States Patent
Fereidouni et al.

(10) Patent No.: US 11,808,703 B2
(45) Date of Patent: Nov. 7, 2023

(54) FLUORESCENCE IMITATING BRIGHTFIELD IMAGING

(71) Applicant: The Regents of the University of California, Oakland, CA (US)

(72) Inventors: Farzad Fereidouni, Davis, CA (US); Richard M. Levenson, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 43 days.

(21) Appl. No.: 17/045,876

(22) PCT Filed: Oct. 2, 2020

(86) PCT No.: PCT/US2020/053976
§ 371 (c)(1),
(2) Date: Oct. 7, 2020

(87) PCT Pub. No.: WO2021/067726
PCT Pub. Date: Apr. 8, 2021

(65) Prior Publication Data
US 2023/0131930 A1    Apr. 27, 2023

Related U.S. Application Data

(60) Provisional application No. 62/910,197, filed on Oct. 3, 2019.

(51) Int. Cl.
*G01N 21/64*    (2006.01)
*G02B 21/12*    (2006.01)
(Continued)

(52) U.S. Cl.
CPC ......... *G01N 21/6458* (2013.01); *G02B 21/12* (2013.01); *G02B 21/16* (2013.01);
(Continued)

(58) Field of Classification Search
None
See application file for complete search history.

(56) References Cited

U.S. PATENT DOCUMENTS 6,169,816 B1 *  1/2001  Ravkin ............... G01N 15/1475
                                                   382/128
7,945,077 B2 *  5/2011  Demos ................. A61B 5/0071
                                                   382/128
(Continued)

FOREIGN PATENT DOCUMENTS

WO    2018175565 A1    9/2018

OTHER PUBLICATIONS

ISRWO of the U.S. Patent office for PCT Patent Application No. PCT/US2020/053976 dated Dec. 15, 2020.
(Continued)

*Primary Examiner* — David P Porta
*Assistant Examiner* — Djura Malevic
(74) *Attorney, Agent, or Firm* — Park, Vaughan, Fleming & Dowler LLP

(57) ABSTRACT

The disclosed embodiments provide a system that images a tissue sample. During operation, the system receives the tissue sample, which has been stained using absorbing and fluorescently emitting stains. Next, the system illuminates the tissue sample with excitation light having a wavelength or wavelengths in a range that covers a portion of an absorption spectrum for both fluorescently emitting and absorbing stains, whereby the excitation light interacts with stained tissue located inside the tissue sample to both limit penetration depth and generate emitted dye fluorescence and tissue autofluorescence that provides a backlight, which is absorbed by features in stained tissue located on or near the surface of the tissue sample. Next, the system uses an
(Continued)

imaging device to capture an image of emitted fluorescence that emanates from the surface of the tissue sample.

29 Claims, 7 Drawing Sheets
(5 of 7 Drawing Sheet(s) Filed in Color)

(51) Int. Cl.
*G02B 21/06* (2006.01)
*G02B 21/16* (2006.01)
(52) U.S. Cl.
CPC .............. *G01N 2021/6439* (2013.01); *G01N 2201/06193* (2013.01)

(56) References Cited

U.S. PATENT DOCUMENTS

| | | | | |
|---|---|---|---|---|
| 8,320,650 | B2* | 11/2012 | Demos | A61B 5/417 |
| | | | | 382/128 |
| 9,297,992 | B2* | 3/2016 | Ganser | G02B 21/16 |
| 9,329,130 | B2* | 5/2016 | Chan | G01N 21/6486 |
| 9,541,504 | B2* | 1/2017 | Hoyt | G06V 20/695 |
| 9,625,387 | B2* | 4/2017 | Demos | G01N 21/6428 |
| 9,683,939 | B2* | 6/2017 | Ghosh | G02B 21/16 |
| 9,697,582 | B2* | 7/2017 | Grunkin | G06T 7/0012 |
| 9,964,489 | B2* | 5/2018 | Levenson | G01N 21/6458 |
| 10,234,445 | B2* | 3/2019 | Ghosh | G01N 21/6452 |
| 10,267,965 | B2* | 4/2019 | Yamazawa | H05B 45/00 |
| 10,274,713 | B2* | 4/2019 | Kobayashi | G02B 21/06 |
| 10,370,698 | B2* | 8/2019 | Nolan | C12Q 1/6813 |
| 10,393,725 | B2* | 8/2019 | Ghosh | G02B 5/0294 |
| 10,578,850 | B1* | 3/2020 | Putman | H04N 23/90 |
| 11,168,350 | B2* | 11/2021 | Nolan | G01N 33/54306 |
| 11,294,162 | B2* | 4/2022 | Putman | G02B 21/361 |
| 11,662,563 | B2* | 5/2023 | Putman | G02B 21/0016 |
| | | | | 348/79 |
| 2007/0043341 | A1* | 2/2007 | Anderson | A61B 34/71 |
| | | | | 606/12 |
| 2008/0074644 | A1* | 3/2008 | Levenson | G01N 21/23 |
| | | | | 356/36 |
| 2008/0317325 | A1* | 12/2008 | Ortyn | G01N 15/147 |
| | | | | 382/133 |
| 2012/0108982 | A1* | 5/2012 | Hoyt | A61B 5/1075 |
| | | | | 600/476 |
| 2012/0200694 | A1* | 8/2012 | Garsha | G01N 21/6456 |
| | | | | 382/128 |
| 2013/0017570 | A1* | 1/2013 | Ohashi | C12Q 1/66 |
| | | | | 435/377 |
| 2015/0278625 | A1* | 10/2015 | Finkbeiner | G02B 21/0088 |
| | | | | 348/79 |
| 2016/0077007 | A1* | 3/2016 | Demos | G01N 21/6428 |
| | | | | 435/29 |
| 2017/0176336 | A1* | 6/2017 | Dimitriadis | A61B 1/043 |
| 2017/0191937 | A1* | 7/2017 | Levenson | G01N 21/6445 |
| 2017/0248574 | A1* | 8/2017 | Ghosh | G02B 21/16 |
| 2019/0154652 | A1* | 5/2019 | Ghosh | G02B 21/16 |
| 2020/0150042 | A1* | 5/2020 | Fereidouni | G02B 6/0038 |
| 2020/0257100 | A1* | 8/2020 | Putman | G02B 21/16 |
| 2021/0199582 | A1* | 7/2021 | Fereidouni | G01N 21/6428 |
| 2021/0382318 | A1* | 12/2021 | Fereidouni | G01N 21/27 |
| 2022/0221703 | A1* | 7/2022 | Putman | G01N 21/6458 |
| 2023/0131930 | A1* | 4/2023 | Fereidouni | G02B 21/16 |
| | | | | 600/476 |

OTHER PUBLICATIONS

Benjamin Taylor Terry, "Rapid Provisional Microscopic Diagnosis of Malignancy without a Microtome", JAMA. 1924;83(15):1127-1129. doi:10.1001/jama.1924.02660150011003.

Duchesne, Stephan R., "The Terry Rapid Razor Section Method for Intraoperative Diagnosis: Revival for Contemporary Application", University of Calgary, http://dx.doi.org/10.11575/PRISM/28398, http://hdl.handle.net/11023/3047, 2016.

\* cited by examiner

FLUORESCENCE IMITATING BRIGHTFIELD IMAGING

RELATED APPLICATION

This application claims priority under 35 U.S.C. § 119 to U.S. Provisional Application No. 62/910,197, entitled "Fluorescence Imitating Brightfield Imaging" by inventors Richard M. Levenson and Farzad Fereidouni, filed on 3 Oct. 2019, the contents of which are incorporated by reference herein.

BACKGROUND

Field

The disclosed embodiments generally relate to techniques for imaging tissue samples. More specifically, the disclosed embodiments relate to a technique for imaging tissue samples that operates by illuminating stained tissue inside a tissue sample to produce fluorescent emissions, which function as a backlight that is absorbed by features in stained tissue located on the surface of the tissue sample.

Conventional histopathology presently provides the most practical and logistically feasible technique for handling, preserving, and evaluating tumors, and for many years has been the mainstay and gold standard for cancer diagnosis. These conventional histopathology techniques typically involve formalin-fixation and paraffin-embedding (FFPE) tissue processing with microtome sectioning and staining.

Over the years, important advances in evaluating FFPE tissue have been made, including the advent of immunohistochemistry (IHC) in the 1970s, fluorescence in-situ hybridization (FISH) in the early 1980s, and methods for assessing DNA sequence and mRNA expression from FFPE tissue in the 2010s. Nevertheless, it is well-known that FFPE-based processing is sub-optimal for these molecular assays and cannot be used for certain applications due to the fixative-, heat- and solvent-induced nucleic acid fragmentation and degradation. Meanwhile, diagnostics, including predictive biomarker analyses, are confronted by two serious challenges: (1) increasing numbers and complexity of ancillary molecular diagnostic tests; and (2) ever-smaller tissue biopsy material on which to perform them. Similarly, critical research questions, particularly those related to early detection and then the necessary distinction between indolent versus potentially lethal early-stage lesions also require the appreciation of microanatomic (histological) structures without incurring cell or tissue destruction.

Also, FFPE-based processing techniques are quite slow, minimally requiring multiple hours. Hence, it is typically necessary to wait overnight to obtain a diagnosis, and if transportation is involved, many days. Note that in surgical-guidance settings, it is advantageous to obtain results right away, to inform a surgeon about whether they successfully removed a tumor and/or identify the type of tumor. Also, in biopsy situations, if an answer can be obtained the same day, time-critical care can be dramatically accelerated.

Hence, what is needed is a new technique for imaging tissue samples that does not suffer from the above-described disadvantages of conventional histopathology techniques.

SUMMARY

The disclosed embodiments provide a system that images a tissue sample. During operation, the system receives the tissue sample, which has been stained using absorbing and fluorescently emitting stains. Next, the system illuminates the tissue sample with excitation light having a wavelength or wavelengths in a range that covers a portion of an absorption spectrum for both fluorescently emitting and absorbing stains, whereby the excitation light interacts with stained tissue located inside the tissue sample to both limit penetration depth and generate emitted dye fluorescence and tissue autofluorescence that provides a backlight, which is absorbed by features in stained tissue located on or near the surface of the tissue sample. Next, the system uses an imaging device to capture an image of emitted fluorescence that emanates from the surface of the tissue sample.

In some embodiments, the excitation light has a wavelength or wavelengths that falls in a range between 320 nm and 800 nm.

In some embodiments, the image is captured through an emission filter that filters out the excitation light.

In some embodiments, the emission filter comprises one of the following: a long-pass emission filter; a multi-band-pass filter; and a notch filter.

In some embodiments, the absorbing and fluorescently emitting stains comprise hematoxylin and eosin.

In some embodiments, additional dyes or stains are used to label additional tissue components, wherein the additional dyes or stains include one or more of the following: acridine orange, toluidine blue, rhodamine, and propidium iodide.

In some embodiments, the excitation light includes light from multiple frequency ranges, which are applied either simultaneously or sequentially.

In some embodiments, the excitation light includes light from multiple laser lines, which pass through a multi-line emission filter.

In some embodiments, the staining of the tissue sample involves simultaneously or sequentially performing immunofluorescence staining to provide information on location and abundance of specific molecular species.

In some embodiments, during the imaging process, the tissue sample is located in a modified histology cassette or other sample holder, which includes a transparent window against which the tissue sample is compressed. Note that this histology cassette can be implemented in a number of ways. For example, it can be large in size and it can include a large window. Moreover, it can be made with different window materials, such as Gorilla Glass™ or plastic. It can also be reusable or disposable.

In some embodiments, the imaging device includes one or more of the following: a monochrome camera; a color camera; and a multi-spectral image-capture device.

In some embodiments, the image is captured through an imaging objective lens and is directed toward an eyepiece or a digital image capture device.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
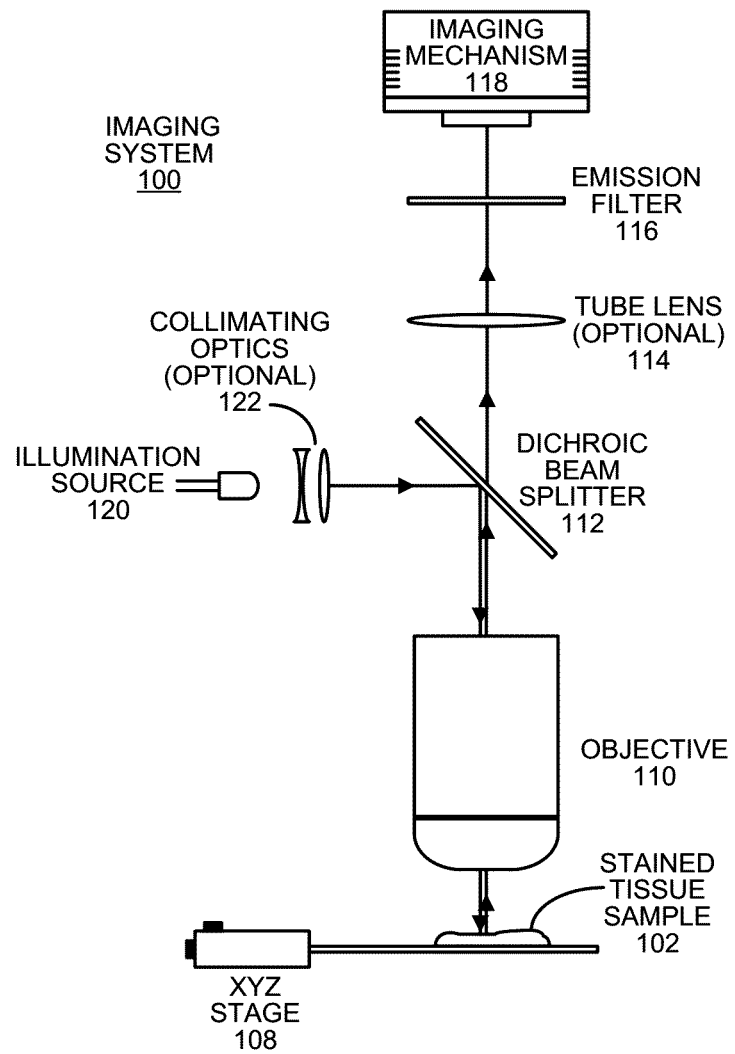
FIG. 1 illustrates an imaging system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

We have developed a new technique for imaging unsectioned tissue that is referred to as "FIBI" (for Fluorescence Imitating Brightfield Imaging), which eliminates the need for FFPE. FIBI enables rapid non-destructive micromorphology diagnosis. Because the paraffin-based steps can be skipped, the specimens can proceed immediately to molecular assays such as RNA sequencing or any of plethora of other methods. It is also compatible with thick-tissue-compatible rapid immunofluorescence techniques. One strategy to image tumors involves the deployment of novel organic-light-emitting-diode (OLED)-inspired, bright, non-toxic, and photostable multicolor fluorescent and magnetic nanoparticles that will enable very rapid (minutes) immunofluorescence assays for tumor biomarkers. The combination of slide-free morphology and molecular imaging made possible by this new technique provides significant new capabilities.

Because it can avoid standard histology processing techniques, specimens imaged with FIBI exhibit non-inferiority, improved quality and potential for semi-automated diagnosis from very small biopsies versus standard FFPE-treated tissues. A typical FIBI workflow can include capture of digital images of small biopsies generated near point of care for evaluation within minutes, perhaps remotely by pathology experts, accompanied by real-time immunofluorescence assays, and followed, if indicated, by rapid RNA sequencing or other molecular assays using histologically guided panels, on nucleic acids quickly extracted from the fresh specimen. This makes it possible to compress elaborate diagnostic workups that can involve multiple separate biomarker evaluations down to two to three steps that can be routinized and deployed even in minimally equipped settings. The ultimate result is rapid, definitive and precise diagnosis and therapy guidance achieved with small biopsies, with decrease in cost, delay, and patient anxiety. FIBI can also be used to improve the quality and yield of biospecimen banks that can empower future research activities.

FIBI facilitates the rapid histomorphological examination of a slide-free, thick tissue specimen via the light absorption properties of chemical dyes that affect the depth of light penetration. We describe the application of a well-known histologic dye, hematoxylin, in this context, but additional light-absorbing dyes can prove useful as well.

Hematoxylin absorbs a broad spectrum of light; this phenomenon causes a reduced penetration of excitation light into the tissue, thereby limiting the imaging volume to something slightly thicker than a conventional histology slide. The use of eosin provides additional value in two ways. The diffused fluorescence signal contributed by eosin illuminates "from behind" the specimen surface, thereby mimicking the transillumination light in regular brightfield microscopy. In addition, the fluorescence signal from eosin, in places where it accumulates in higher concentrations, generates the familiar pink-red staining seen in conventional hematoxylin and eosin (H&E). Note that the dependance of eosin fluorescence and absorption spectra on concentration has been reported before. Together these phenomena create images that are very close to those seen using standard histology techniques, and the images can be readily viewed live through the microscope, optionally assisted with custom emission filters for color balance, as well as using digital cameras that can have a variety of technical capabilities.

Details

Hematoxylin is a widely used dye for histology and was the first dye we observed this behavior in. When tissue is stained with hematoxylin, various excitation wavelengths (405 nm, 440 nm, 500 nm) result in an image that is remarkably "thinner" in terms of imaging volume than images generated with the same excitation wavelengths but without hematoxylin. Theoretically, any dye that has the following properties can be useful to FIBI to facilitate the reduction of imaging volume: (1) the dye must not be fluorescent; (2) the dye must absorb at the wavelength being used to excite the sample; and (3) the dye must stain a majority of tissue components to some degree.

Hematoxylin by itself provides little contrast of non-nuclear tissue components. In traditional histology, a second stain is employed to provide color contrast and improved spatial context to the viewer. This is traditionally an eosin stain (often eosin Y), which is viewed in brightfield as an absorbing dye contributing a pink color to stained portions of the specimen. However, it is also fluorescent. When eosin is used in combination with hematoxylin and thick specimens are excited with excitation light, potentially at a variety of wavelengths, an image is generated that is remarkably close to traditional thin-section histology, both in content and contrast.

Eosin has some unusual properties that give it an advantage for FIBI over other conventional fluorescent counterstains. One of these properties is the relatively weak binding of eosin to tissue components; when a sample is stained with eosin and mounted in an aqueous media, the stain tends to continue to leach out of the tissue and into surrounding spaces, large and small. Conventionally, this has been an annoyance, but for FIBI this helps contribute to a diffuse backlighting fluorescence. Fluorescence images normally have a dark background, contrasting with brightfield imaging techniques that have a white background. Pathologists are well-versed in interpreting brightfield images but outside of special circumstances, they generally do not feel comfortable interpreting relatively unfamiliar fluorescence-mode images. FIBI images combine the best of both; the background and staining pattern is similar to conventional H&E-stained thin sections, allowing for a quick acclimation period. However, because FIBI works with thick, fresh or fixed, but unsectioned tissue, it can be accomplished within minutes of acquiring a tissue specimen. Steps such as dehydration, paraffin-embedding, sectioning, and mounting on slides are not required, cutting hours off the time needed to acquire high-quality images. These images can be viewed directly, or can be quickly processed using a variety of tools (either algorithmic or machine-learning-based) to generate images as good as or better than can be visualized on conventional H&E slides.

Other conventional techniques that achieve similar images are Optical Coherence Tomography (OCT), confocal, multiphoton, lightsheet, structured illumination, and microscopy with UV surface excitation (MUSE) microscopy. While these techniques have their own pros and cons, they all require conversion to traditional brightfield modes for pathologist interpretation. In addition, the cost of the microscopes above is typically well above the cost of the microscopes conventionally deployed in pathology settings, preventing their wide-spread adoption. Other techniques have used hematoxylin and eosin staining for three-dimensional imaging, but these have relied on multi-photon imaging setups to generate optical sectioning performance.

MUSE is a technology that is closely related to FIBI. (See Farzad Fereidouni, Ananya Datta Mitra, Stavros Demos, Richard Levenson, "Microscopy with UV Surface Excitation (MUSE) for slide-free histology and pathology imaging," Proc. SPIE 9318, Optical Biopsy XIII Toward Real-Time Spectroscopic Imaging and Diagnosis, 93180F, 11 Mar. 2015.) The mechanisms behind MUSE operate based on two principles: (1) UV light at around 280 nm will only penetrate even thick tissue specimens to a depth of no more than about 10 microns, a thickness only slightly greater than that of a standard histology slide; and (2) UV light at this wavelength can excite a large variety of fluorescent stains, which then emit in their familiar visible range, a property that was not well-appreciated even by those well-versed in fluorescence microscopy. After processing with color-conversion software, the resulting fluorescent images can be converted, rapidly, to resemble those seen with conventional pathology.

FIBI provides a number of advantages over MUSE, which are described below.

Advantages of FIBI Over MUSE (1) FIBI uses brighter, less expensive excitation sources. FIBI can employ convenient LED sources in the visible range that are both brighter and cheaper than the UV LEDs required for MUSE. Brighter excitation with brighter emission means faster imaging. Multiple excitation wavelengths can be deployed with FIBI, which can provide additional spectral contrast. This is not as conveniently achieved with MUSE optics. MUSE can deploy other UV sources beyond LEDs if increased brightness or other excitation properties are required, but these will be considerably more expensive.

(2) FIBI is immediately compatible with immunofluorescence reagents. In addition to imaging the specimens stained with histology stains, such as hematoxylin and eosin, it is possible to simultaneously or sequentially perform immunofluorescence staining to provide information on location and abundance of specific molecular species. Probes can extend beyond standard antibodies to include nanobodies, peptides, nucleic acids, and other entities that can bind to defined targets. If these are labeled with fluorescent probes of sufficient abundance and brightness, they can be visualized even in the presence of the FIBI background stains using only labeled primary reagents. If necessary, primary and secondary antibodies or other visualization techniques can be deployed.

(3) FIBI provides an epifluorescence optical light path versus oblique illumination for higher numerical aperture lenses and imaging flexibility. With this arrangement there are no constraints based on working distance. It is also easy to switch from lens to lens if desired and employing lenses with higher NA, because the excitation geometry is independent of lens choice. Higher magnification lenses are easier to deploy with FIBI than with MUSE. The highest resolution described to date is enabled by the use of a high numerical aperture (NA) 10× lens. Better resolution would require higher NA lenses, which then require shorter working distances between lens and specimen. This, however, can be problematic with the current MUSE design, which deploys oblique, off-axis excitation rather than standard epifluorescence optical light paths. The advantage of oblique illumination is that the excitation light does not have to travel through the objective lens, which in most cases cannot transmit light in the 280-nm UV range. However, getting the light in obliquely is difficult if there is not sufficient working distance, which is why MUSE imaging is usually limited to that provided by the relatively long-working distance high-quality 10× lens used to date, which is currently excellent, as we can use a high-NA (0.45) 10× objective.

(4) In FIBI, there is no requirement for potentially expensive UV transparent sample support or viewing windows; inexpensive glass platforms or coverslips can be used.

(5) FIBI is compatible with existing fluorescent microscopes for rapid viewing through eyepieces, or single frame or large-field-of-view imaging with a motorized stage. Images are natively similar to H&E so direct viewing is possible. A color-shaping custom emission filter can be included to cause the directly perceived images to more closely resemble conventional H&E slides. Also, no potentially DNA-injurious or protein-cross-linking UV light is used with FIBI.

Staining Recipes

We now describe a number of recipes for stains that can be used with FIBI.

(1) Mayer's hematoxylin stock solution (1 mg/ml):
  I. Dissolve 50 g of aluminum potassium sulfate (alum) in 1000 ml of diH2O.
  II. When alum is completely dissolved, add 1 g of hematoxylin.

III. When hematoxylin is completely dissolved, add 0.2 g of sodium iodate and 20 ml of glacial acetic acid.
IV. Bring to boil and cool. Filter if it is necessary.
(2) Ehrlich's hematoxylin stock solution (1 mg/ml):
  I. Combine and mix: 100 ml of diH2O, 100 ml of 95% ethanol, 100 ml of glycerol, 10 ml of glacial acetic acid, 2 g of hematoxylin, and alum (to excess). Note that the solution is ready to use when it turns dark red.
(3) Delafield's hematoxylin stock solution (1 g/ml):
  I. Dissolve 8 g of hematoxylin in 50 ml of 95% ethanol.
  II. Then make an alum-saturated aqueous solution (15 gm/100 ml).
  III. Add the hematoxylin dissolved in the alcohol to the alum solution and expose to light and air in an unstoppered bottle for 3-5 days.
  IV. Next filter and add 200 ml of glycerin and 200 ml of 95% ethanol.
  V. Allow the solution to stand in the light about 3 days, filter and keep in a tightly stoppered bottle.
(4) Alcoholic eosin stock solution/working solution (1 mg/ml):
A. Stock Solution.
  I. Add 2 g of water-soluble eosin Y to 40 ml of diH2O and mix until dissolved.
  II. Then add 160 ml of 95% ethanol and mix.
  III. Store at room temperature.
B. Working Solution.
  I. Add 200 ml of eosin Y stock solution to 600 ml of 80% ethanol and mix well.
  II. While working in a fume hood, add 4 ml of glacial acetic acid and mix well.
  III. Store covered at room temperature.
(5) Aqueous eosin 2% stock solution:
  I. Measure out 2 g of eosin y disodium salt.
  II. Add to 100 ml diH2O and mix till fully dissolved.
  III. Add 400 ul of glacial acetic acid and mix well.
(6) Aqueous eosin y (American MasterTech):
  I. Measure out 100 ml of aqueous eosin y.
  II. Add 400 ul of glacial acetic acid and mix well.
(7) Acridine orange (0.3 mg/ml):
  I. Prepare 330 ul of PBS and buffer it to a pH of 4.4 (or desired pH).
  II. Add 10 ul of acridine orange and mix well.
(8) Acid alcohol:
  I. Add 1 ml of 38% HCL in 50 ml of 70% ethanol and mix well.
(9) Acidic diH2O:
  II. Add 1 ml of 38% HCL to 50 ml of diH2O and mix well.

Staining Protocol

Fresh tissue preparation involves the following steps. Prior to staining, prepare a sample with the dimensions 1 cm×1 cm×0.5 cm (the length and width and depth of the specimen can range anywhere from 0.1 to 10 cm or larger in any dimension. Optional: rapidly fix the specimen in either approximately 40 ml of ethanol or PBS for 30 s in a microwave (600 W).

There are a number of staining protocols, which include serial staining (i.e., the tissue is exposed to a number of dyes one after the other, with additional washing steps), or combined solutions, in which all the dyes are combined into a single solution. The latter is more efficient and can be modified by adding additional dyes for more informative color contrast after the described single stain.

Serial staining examples:
(1) 30 s rinse in diH2O, 20 s Mayer's hematoxylin diluted in diH2O (0.5 mg/ml), 30 s Scott's bluing reagent, 30 s alcoholic eosin (1 mg/ml), 2×30 s rinse in diH2O.
(2) 30 s rinse in diH2O, 30 s Mayer's hematoxylin diluted in diH2O (0.5 mg/ml), 30 s Scott's bluing reagent, 30 s alcoholic eosin (1 mg/ml), 2×30 s rinse in diH2O.
(3) 30 s rinse in diH2O, 20 s Mayer's hematoxylin (1 mg/ml), 30 s Scott's bluing reagent, 30 s alcoholic eosin (1 mg/ml), 2×30 s rinse in diH2O.
(4) 30 s rinse in diH2O, 20 s Mayer's hematoxylin diluted in diH2O (0.5 mg/ml), 30 s Scott's bluing reagent, 30 s alcoholic eosin (1 mg/ml), 30 s rinse in diH2O, 10 s acridine orange pH 4.4, 2×30 s rinse in diH2O.

Some single– or single+ procedures:
(1) 30 s rinse in diH2O, 30 s combination mixture (2 ml of Mayer's hematoxylin diluted in 95% ethanol (0.5 mg/ml), 2 ml of alcoholic eosin (1 mg/ml), 1 ml of Scott's bluing reagent), 2×30 s rinse in diH2O.
(2) 30 s rinse in diH2O, 20 s combination mixture (2 ml of Mayer's hematoxylin diluted in 95% ethanol (0.5 mg/ml), 2 ml of alcoholic eosin (1 mg/ml), 1 ml of Scott's bluing reagent), 2×30 s rinse in diH2O.
(3) 30 s rinse in diH2O, 30 s combination mixture (10 ml of Mayer's hematoxylin diluted in diH2O (0.5 mg/ml), 10 ml of alcoholic eosin (1 mg/ml), 10 ml of Scott's bluing reagent), 2×30 s rinse in diH2O.
(4) 30 s rinse in diH2O, 1 min combination mixture (10 ml of Mayer's hematoxylin diluted in diH2O (0.5 mg/ml), 10 ml of aqueous eosin (2%), 10 ml of Scott's bluing reagent), 2×30 s rinse in diH2O.

Optical Implementation and Specimen Imaging

Optical design: As illustrated in FIG. 1, the sample is gently pressed against a glass (or other visible-light-transparent) thin support using a variety of gentle compression methods and fixtures, and illuminated with excitation light centered at 405 nm (single wavelength or single-wavelength-band sources) using a standard epifluorescence lightpath. This light path includes a dichroic mirror, which directs the excitation light into the imaging objective, and then sends the emitted fluorescence signals captured with the imaging objective through a long-pass emission filter to the camera (image sensor).

Sample positioning: The sample can be placed onto a large image stage, or alternatively, can be introduced into modified histology cassettes, with the removable lid or bottom support altered to contain a transparent window against which the specimen is gently compressed by, e.g., plastic foam when the lid is closed. The benefit of this arrangement is that it is easy to barcode and track the cassette and enclosed specimen, which can also be diverted into conventional FFPE processing by simply replacing the transparent lid (if used) with a conventional perforated one. Note that other types of sample holders be used. For example, sample holders can be as large as 10×10 cm, and they can use different sample-compression techniques.

Additional excitation and imaging techniques: Alternative light paths can be used, including side-launch with standing wave illumination, oblique illumination, and even cellphone-enabled optics with the cell phone lens and camera.

Note that other wavelengths besides 405 can be used, alone or in combination, and the excitation sources can include LEDs, halogen or other conventional fluorescence excitation lamps, laser diodes, or other sources.

Also, light emitted by the specimen can be directed to a monochrome sensor with or without a series of filters for multispectral image data collection, an RGB color sensor with a Bayer pattern for snapshot collection, enhanced snapshot cameras with three non-standard color filters, or four or more for multispectral data capture. The sample can be illuminated sequentially with different excitation wavelengths, or alternatively, the dichroic and other filtering optics can have multiple band passes to allow for simultaneous excitation with a number of sources with single image capture.

For direct viewing, samples can be observed directly through eyepieces on conventional or moderately adapted fluorescence microscopes. As the images generated using H&E stains appear somewhat green, prior to image processing, it can be desirable to include a color-shaping emission filter to adjust the perceived color composition to be, e.g., less green and more pink.

Imaging System

FIG. 1 illustrates an exemplary imaging system 100 for the FIBI technique in accordance with the disclosed embodiments. Imaging system 100 includes an illumination source 120 (e.g., a 405 nm UV LED), which produces excitation light for fluorescence. The excitation light is guided through optional collimating optics 122 and a broadband dichroic beamsplitter 112, and is then focused on a stained tissue sample 102 using an objective 110, such as a Nikon objective 10×NA=0.45. Stained tissue sample 102 is affixed to an XYZ stage 108, which, for example, can have a travel range of 50 mm and 25 mm in x and y directions, and also a limited travel range in the z direction for focusing purposes. In some use cases, stained tissue sample 102 is located in a histology cassette, which includes a transparent window against which the tissue sample is compressed.

The resulting emitted fluorescence from the stained tissue sample 102 is directed back through objective 100 and dichroic beam splitter 112, and then through an optional tube lens 114 and an emission filter 116, which filters out the excitation light, before being captured by an imaging mechanism 118. In one embodiment, imaging mechanism 118 comprises a scientific-grade color camera (Ximea 9MP) that uses a 200-mm tube lens 114 (Thorlab ILT 200).

Acquiring the Image

Figure 2:
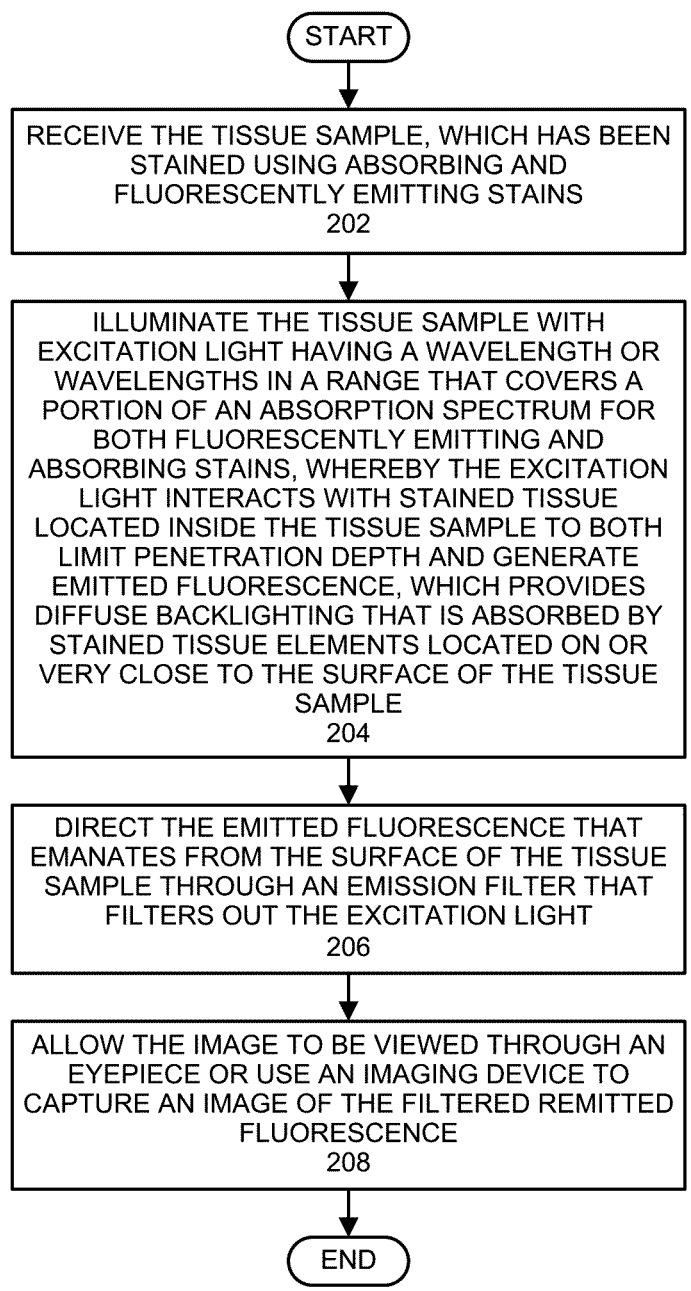
FIG. 2 presents a flow chart illustrating the process of imaging a tissue sample in accordance with the disclosed embodiments.

FIG. 2 presents a flow chart illustrating an exemplary process for imaging a tissue sample using the FIBI technique in accordance with the disclosed embodiments. During operation, the system receives the tissue sample, which has been stained using absorbing and fluorescently emitting stains (step 202). Next, the system illuminates the tissue sample with excitation light having a wavelength or wavelengths in a range that covers a portion of an absorption spectrum for both fluorescently emitting and absorbing stains, whereby the excitation light interacts with stained tissue located inside the tissue sample to both limit penetration depth and generate emitted fluorescence, which provides diffuse backlighting that is absorbed by stained tissue elements located on or very close to the surface of the tissue sample (step 204). In addition, certain tissue components can express their own fluorescent signals and provide additional spatial content. Next, the system directs the emitted fluorescence that emanates from the surface of the tissue sample through an emission filter that filters out the excitation light (step 206.) The system then allows the image to be viewed through an eyepiece or uses an imaging device to capture an image of the filtered emitted fluorescence (step 208).

Image-Processing Operations

After an image is acquired in memory and/or saved on disk, certain image-processing operations can be applied to the image to increase quality and user-acceptability. These image-processing operations can include, but are not limited to: sharpening, magnification, computational superresolution, denoising, etc., and can be implemented using either traditional image-processing functions or through AI-based tools that can be trained to produce the desired image results. Color-mode-conversion functionality in which the native coloration seen in FIBI images is converted to faithfully mimic conventional H&E appearance constitutes an important component of such a set of operations.

However, AI tools can be somewhat slow to apply to large images, and may not provide convenient real-time conversion. One strategy that we have developed is to train an AI system to perform a FIBI-to-H&E conversion, and then use the resulting converted image to provide color data, which is pixel-matched with the original-color FIBI image to train a non-linear matrix color conversion operator that can be applied in near-real-time.

Images, either color (RGB) or multispectral (four or more wavelength bands) can be analyzed or separated into multiple signal layers, which can highlight the presence and appearance of tissue components such as elastin, collagen, and the like, using a large variety of multispectral analysis techniques, which can include, but are not limited to: end-member linear unmixing, phasor analysis, convex hull analysis and non-parametric AI-enabled methods.

Exemplary Images

Figure 3:
FIG. 3 presents an image of a kidney vessel with associated glomeruli and tubules in accordance with the disclosed embodiments.
Figure 4:
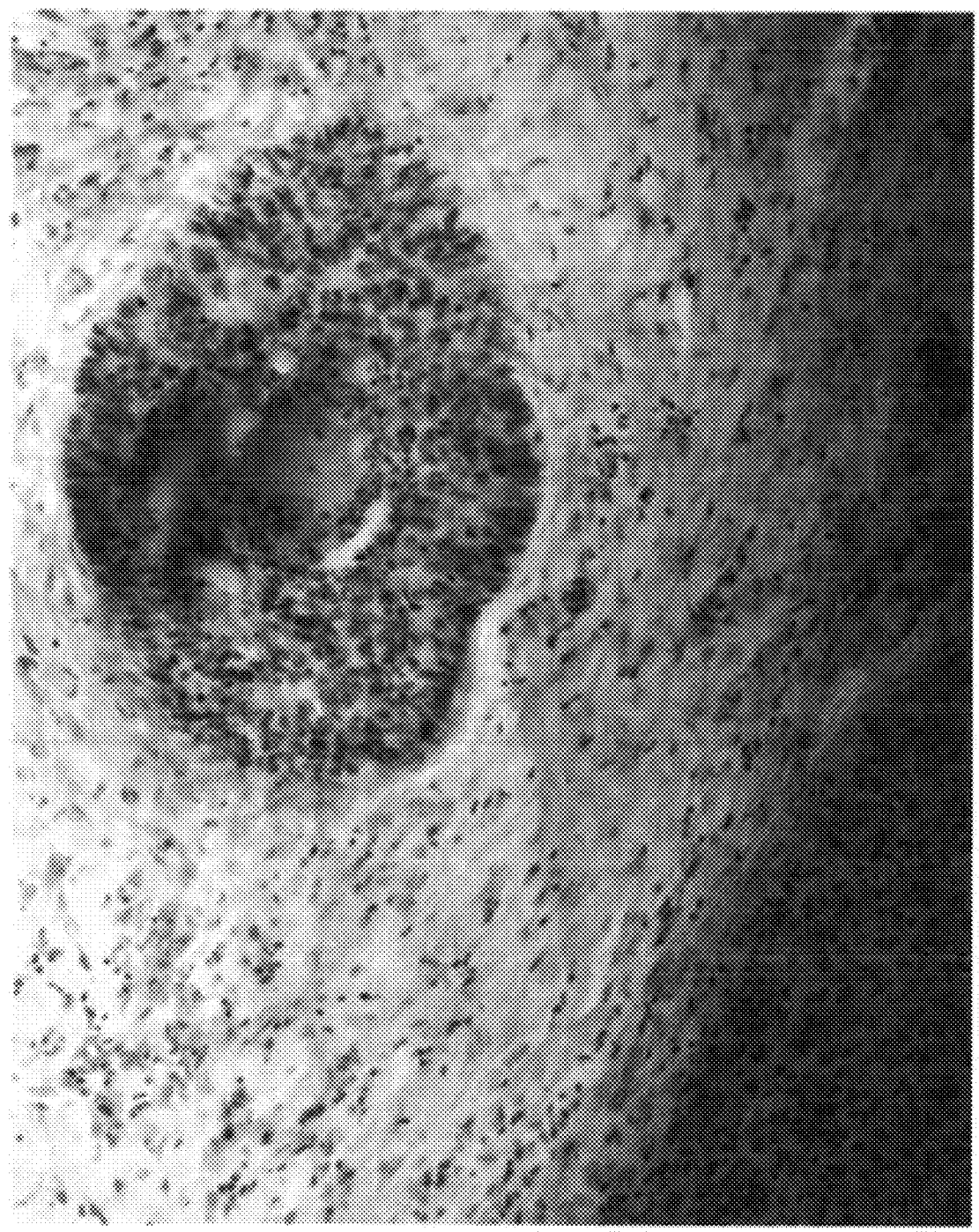
FIG. 4 presents an image of a hepatocellular carcinoma and associated fibrosis in accordance with the disclosed embodiments.
Figure 5:
FIG. 5 presents an image of a mouse small bowel in accordance with the disclosed embodiments.
Figure 6:
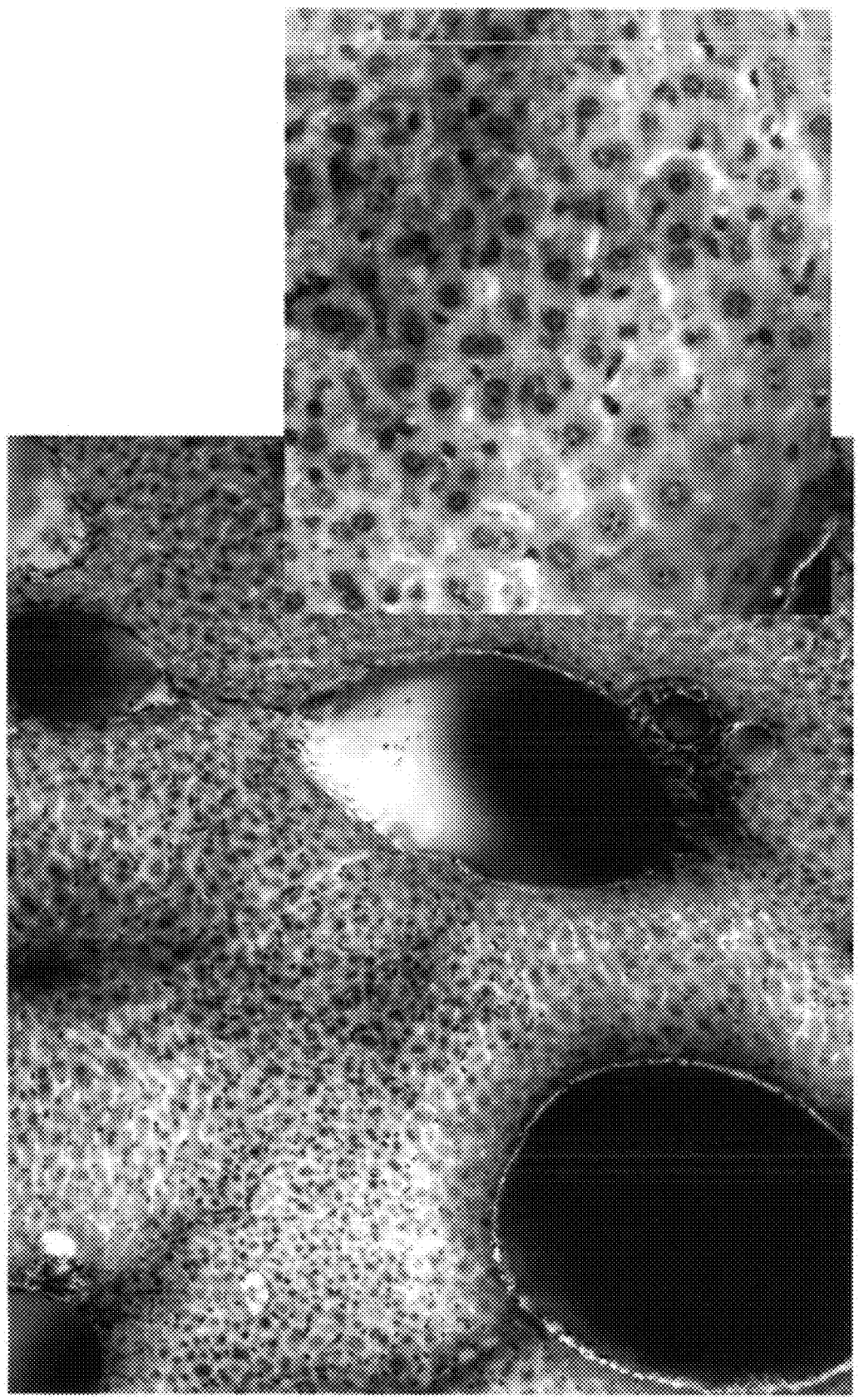
FIG. 6 presents an image of a human liver in accordance with the disclosed embodiments.
Figure 7:
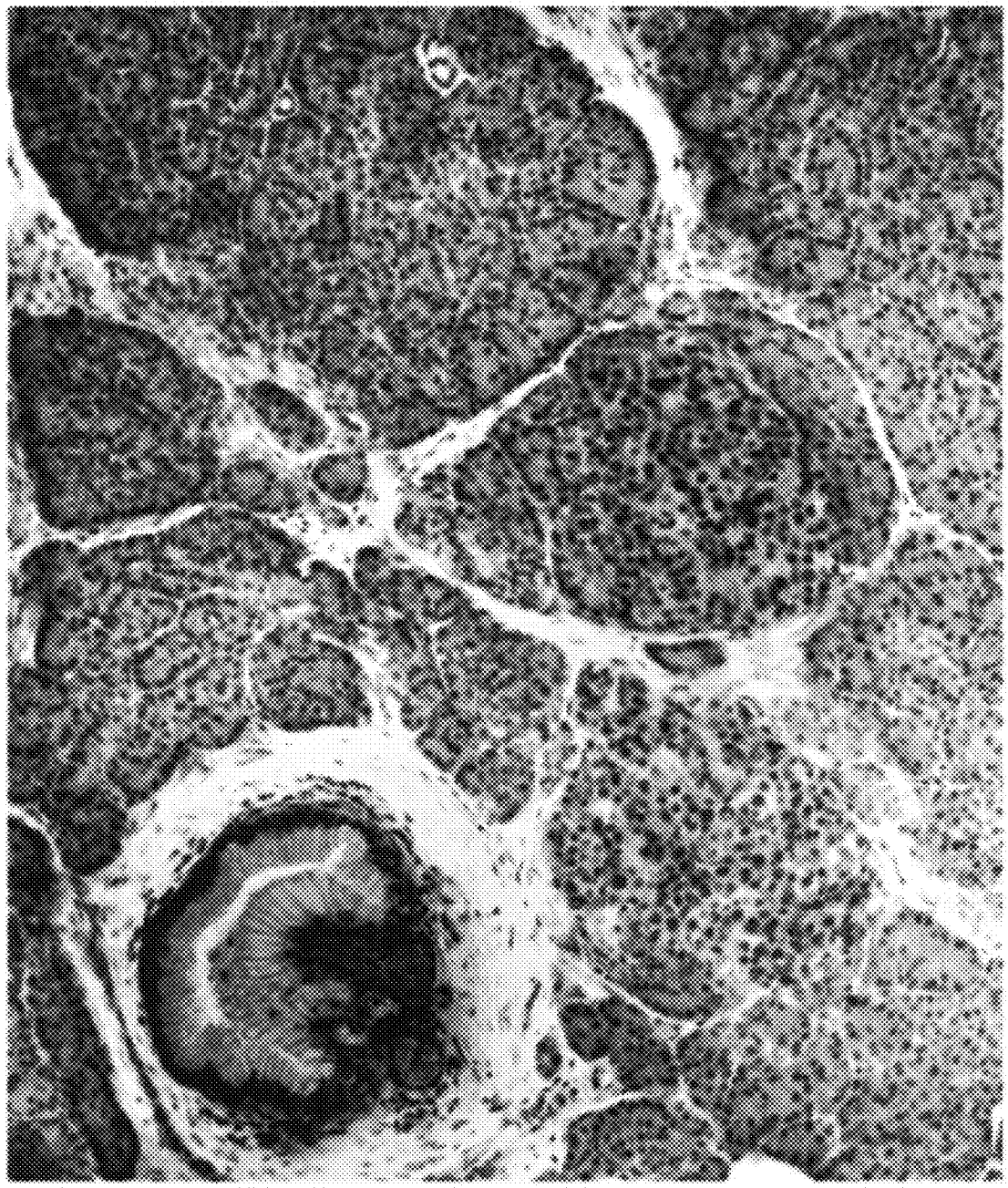
FIG. 7 presents an image of a human pancreas in accordance with the disclosed embodiments.

FIGS. 3-7 present a number of images of tissue samples generated using the FIBI technique. All of the tissue samples were stained with hematoxylin (×30 seconds) and eosin (×30 seconds) and imaged with a 10× lens, using either 405-nm or 440-nm excitation light, and 420-nm or 450-nm long-pass emission filters. The images were captured with a color camera, and auto-white balanced using image-management software. In particular, FIG. 3 presents an image of a kidney vessel with associated glomeruli and tubules; FIG. 4 presents an image of a hepatocellular carcinoma and associated fibrosis; FIG. 5 presents an image of a mouse small bowel; FIG. 6 presents an image of a human liver; and FIG. 7 presents an image of a human pancreas.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for imaging a tissue sample, comprising: staining the tissue sample using absorbing and fluorescently emitting stains; illuminating the tissue sample with excitation light having a wavelength or wavelengths in a range that covers a portion of an absorption spectrum for both fluorescently emitting and absorbing stains;

wherein the excitation light interacts with stained tissue located inside the tissue sample to both limit penetration depth and generate emitted dye fluorescence and tissue auto-fluorescence, which can be absorbed by features in stained tissue located on or near the surface of the tissue sample; and using an imaging device to capture an image of emitted fluorescence that emanates from the tissue sample.

2. The method of claim 1, wherein the excitation light has a wavelength or wavelengths that falls in a range between 320 nm and 800 nm.

3. The method of claim 1, wherein the image is captured through an emission filter that filters out the excitation light.

4. The method of claim 3, wherein the emission filter comprises one of the following:
a long-pass emission filter;
a multi-band-pass filter; and
a notch filter.

5. The method of claim 1, wherein the absorbing and fluorescently emitting stains comprise hematoxylin and eosin.

6. The method of claim 5, wherein additional dyes or stains are used to label additional tissue components, wherein the additional dyes or stains include one or more of the following: acridine orange, toluidine blue, rhodamine, and propidium iodide.

7. The method of claim 1, wherein the excitation light includes light from multiple frequency ranges, which are applied either simultaneously or sequentially.

8. The method of claim 7, wherein the excitation light includes light from multiple laser lines, which pass through a multi-line emission filter.

9. The method of claim 1, wherein staining the tissue sample involves simultaneously or sequentially performing immunofluorescence staining to provide information on location and abundance of specific molecular species.

10. The method of claim 1, wherein during the imaging process, the tissue sample is located in a modified histology cassette or other sample holder, wherein the modified histology cassette includes a transparent window against which the tissue sample is compressed.

11. The method of claim 1, wherein the imaging device includes one or more of the following:
a monochrome camera;
a color camera; and
a multi-spectral image-capture device.

12. The method of claim 1, wherein the image is captured through an imaging objective lens and is directed toward an eyepiece or a digital image capture device.

13. The method of claim 1,
wherein the method further comprises manipulating the captured image using post-capture image-processing tools that perform one or more of the following operations: sharpening, magnification, computational super-resolution, denoising, and color-mode conversion; and
wherein the post-capture image-processing tools can include AI-based processing components.

14. The method of claim 13, wherein images processed for color-mode conversion are used to train a high-speed non-linear color-conversion system to provide near-real-time color conversion to resemble H&E coloration.

15. The method of claim 1, wherein if the captured image is multispectral, the captured image is further analyzed using one or more of: spectral unmixing, convex hull end-member detection, and phasor tools, to provide tissue component signals.

16. A system for imaging a tissue sample, comprising: a stage configured to hold the tissue sample after the tissue sample has been stained using absorbing and fluorescently emitting stains, wherein the absorbing and fluorescently emitting stains comprise hematoxylin and eosin; an illumination mechanism configured to illuminate the tissue sample with excitation light having a wavelength or wavelengths in a range that covers a portion of an absorption spectrum for both fluorescently emitting and absorbing stains; wherein the excitation light interacts with stained tissue located inside the tissue sample to both limit penetration depth and generate emitted dye fluorescence and tissue auto-fluorescence, which can be absorbed by features in stained tissue located on or near the surface of the tissue sample; and an imaging device configured to capture an image of emitted fluorescence that emanates from the tissue sample.

17. The system of claim 16, wherein the excitation light has a wavelength or wavelengths that falls in a range between 320 nm and 800 nm.

18. The system of claim 16, further comprising an emission filter located between the tissue sample and the imaging device, which filters out the excitation light.

19. The system of claim 18, wherein the emission filter comprises one of the following:
a long-pass emission filter;
a multi-band-pass filter; and
a notch filter.

20. The system of claim 16, wherein additional dyes or stains are applied to the tissue sample to label additional tissue components, wherein the additional dyes or stains include one or more of the following: acridine orange, toluidine blue, rhodamine, and propidium iodide.

21. The system of claim 16, wherein the illumination mechanism is configured to provide excitation light from multiple frequency ranges, which are applied either simultaneously or sequentially.

22. The system of claim 21, wherein the excitation light includes light from multiple laser lines, which pass through a multi-line emission filter.

23. The system of claim 16, further comprising a staining system for staining the tissue sample, wherein the staining system facilitates simultaneously or sequentially performing immunofluorescence staining to provide information on location and abundance of specific molecular species.

24. The system of claim 16, wherein during the imaging process, the tissue sample is located in a modified histology cassette or other sample holder, wherein the modified histology cassette includes a transparent window against which the tissue sample is compressed.

25. The system of claim 16, wherein the imaging device includes one or more of the following:
a monochrome camera;
a color camera; and
a multi-spectral image-capture device.

26. The system of claim 16, wherein the image is captured through an imaging objective lens and is directed toward an eyepiece or a digital image capture device.

27. The system of claim 16, further comprising an image-processing mechanism that manipulates the captured image using post-capture image-processing tools that perform one or more of the following operations: sharpening, magnification, computational superresolution, denoising, and color-mode conversion; and
wherein the post-capture image-processing tools can include AI-based processing components.

28. The system of claim 27, wherein the image-processing mechanism uses images processed for color-mode conversion to train a high-speed non-linear color-conversion system to provide near-real-time color conversion to resemble H&E coloration.

29. The system of claim 27, wherein if the captured image is multispectral, the image-processing mechanism further analyzes the captured image using one or more of: spectral unmixing, convex hull end-member detection, and phasor tools, to provide tissue component signals.

* * * * *